J. B. NAU.
PROCESS OF PURIFYING AND REFINING IRON.
APPLICATION FILED SEPT. 16, 1909.
984,590.
Patented Feb. 21, 1911.
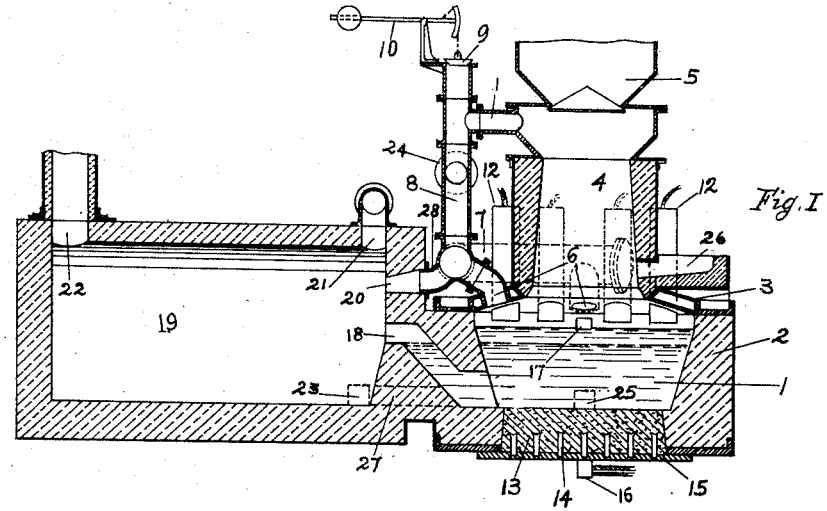
Fig. I
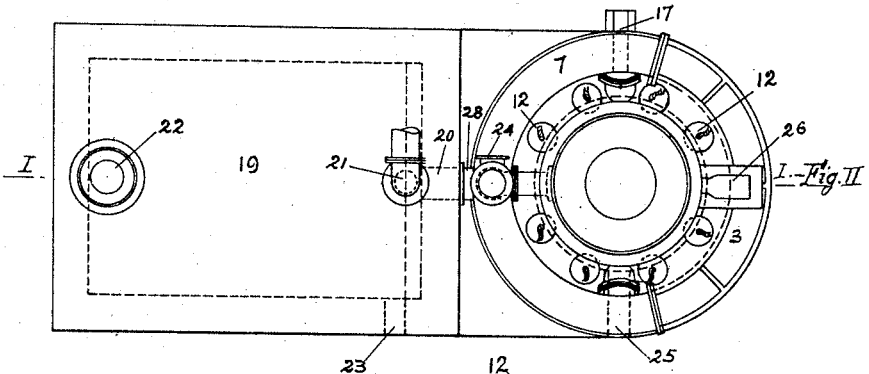
Fig. II
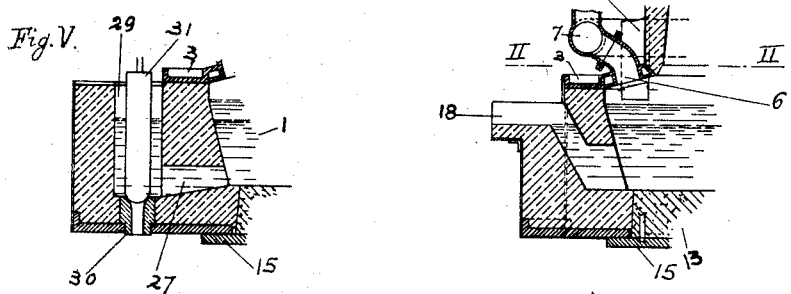
Fig. V
Fig. III
Fig. IV
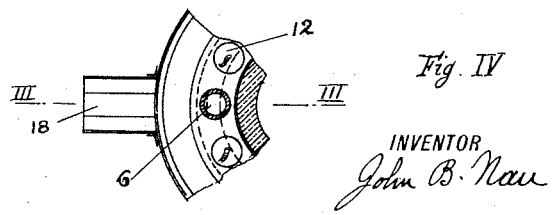
WITNESSES:
H. N. Ten Broeck
Arthur H. Coeby
INVENTOR
John B. Nau

UNITED STATES PATENT OFFICE.

JOHN B. NAU, OF NEW YORK, N. Y.

PROCESS OF PURIFYING AND REFINING IRON.

984,590.    Specification of Letters Patent.    Patented Feb. 21, 1911.

Application filed September 16, 1909. Serial No. 518,014.

*To all whom it may concern:*

Be it known that I, JOHN B. NAU, a citizen of the United States of America, residing at New York city, county of New York, and State of New York, have invented a new and useful Improvement in Processes of Purifying and Refining Iron, of which the following is a specification:

The present invention relates to a refining and purifying process with the twofold purpose of obtaining on one hand a rapid partial refining of pig iron by means of iron ore or other suitable metallic oxids, and on the other hand a controllable final temperature of the refined metal within desired limits, whereby it will be made possible to impart at all times enough fluidity to the refined metal and the slag forming during the refining operation to run both metal and slag without difficulty from the refining apparatus.

The rapid refining of the metal, forming the chemical part of the process, will be obtained by creating very intimate and extended contact between the liquid pig iron to be refined and the purifying ore used in the refining operation, with the aid of special immersion means of the kind forming the basis of my Patent No. 786,048 of March 28, 1905.

The partial refining of pig iron contemplated in the process described in the above-named patent as well as in the process hereinafter described, consists in the partial elimination from the iron of such elements as silicon, phosphorus, manganese, carbon, sulfur and some others, less commonly but possibly found in pig iron.

It is well known that when establishing intimate contact under the right conditions of temperature between pig iron to be refined and oxidizing material, such, as for instance, oxid of iron of the kind found in iron ores, which latter can therefore be used as an oxidizing material; the above-named elements will be eliminated to a certain degree and in a certain order by oxidation, and the oxygen necessary in this oxidation will be reduced from the iron ore and the contemplated refining of the iron will naturally take place. But this refining, constituting the main object of the operation, is not the only result obtained. Like all other chemical operations, the reactions taking place during the refining will naturally give rise to calorific phenomena, that through their action on the final temperature of the refined metal and the resulting slag will largely influence the final success of the operation. Thus the oxidation or burning of the elements in question on the one hand will be a source of heat, while on the other hand the reduction of oxygen from the oxidizing material will be a cause of heat consumption.

Adding the heat derived from the oxidation of the elements to the heat derived from all other sources, among which may be mentioned the heat brought in by the heated ore, the heat contained in the liquid iron, the heat of formation of the slag, etc., and subtracting from the total heat thus furnished all the heat required in the reduction of the oxygen from the oxidizing material, the heat required to raise the temperature of the ore to the final temperature in the operation, the latent heat of fusion of the slag, the heat lost by radiation, etc., a fairly correct idea as to the final temperature of the refined metal can be obtained.

With the use of the calorific factors established by experiment and necessary in the heat calculation, it can be shown that when eliminating from the metal the elements Si, P and Mn by means of oxygen derived from $Fe_2O_3$, for instance, more heat will be developed in the oxidation of the elements than there will be heat consumed in the dissociation of $Fe_2O_3$. It can further be shown that by burning carbon to CO by means of oxygen derived from $Fe_2O_3$ a great loss of heat will take place. The removal of the first three elements from the iron under the conditions will therefore be accompanied by an increase of temperature of the refined metal, while the removal of carbon under the same conditions will be the cause of a fall in the final temperature of the metal. The removal or partial removal of carbon would, therefore, be detrimental to the calorific conditions of the herein proposed process. But in a rapid refining process of the nature hereinafter described, the removal of this element is neither contemplated nor to be feared.

Experience such as obtained in the manufacture of washmetal, for instance, shows that when submitting liquid pig iron to the rapid refining action of iron oxids under the right conditions of temperature, the removal of carbon will only begin or will hardly have started at the moment when all the other elements have been removed to the desired extent. The nature itself of the purifying process contemplates such rapid action greatly for the purpose of avoiding the elimination of carbon with the accompanying loss of heat. This elimination in most cases will be far below 10% of the total carbon. The bulk of this element will, therefore, still remain in the refined metal, toward the final fluidity of which at a relatively low temperature it will contribute very materially.

The establishment of the heat balance on the lines above indicated will show that certain classes of pig iron refined rapidly under the right conditions in the manner and to the extent mentioned will give a final metal and a slag with a higher temperature than the temperature of the original liquid pig iron. Both refined metal and slag will be very fluid and can easily be run from the refining apparatus. Under such conditions the refining operation furnishes its own heat and is self-sustaining.

With a different iron, or even the same iron present under somewhat different conditions, as, for instance, to original heat or composition of refining ore, a slight loss of temperature will be found in the refined metal. Still even in this case the operation can be successful, provided the temperature of the original pig iron be far above its melting point as will be the case, for instance, with iron running from the blast furnace, in which iron is stored away a surplus of heat that when used up in the operation will make the latter successful, because the temperature of the refined metal will still be high enough for all practical purposes. In this case again the refining operation will be self-sustaining.

The method described and claimed in my Patent No. 786,048 of March 28, 1905 is of this self-sustaining nature; it furnishes its own heat, but as no provision is made or contemplated in that process for the use of any other heat source to take part in the refining operation proper, the final temperature of the refined metal can not be corrected nor otherwise controlled. Still, under the right conditions of temperature of refining ore and pig iron and with the right chemical composition of the latter, the self-sustaining operation can be carried out very successfully in many cases. But owing to the unfavorable chemical composition of a large class of pig iron found in the market or owing to other unfavorable conditions, the heat derived from the chemical sources during the refining operation added to the heat from the other heat sources would not be sufficient to make the self-sustaining method applicable in all cases.

The partial refining of most pig iron can be made practical under varying conditions by adding during the refining operation proper the heat from an independent outside heat source to the heat derived from the chemical heat source, which latter is the only one directly developed in the self-sustaining method during the refining operation proper and in the refining zone. This combination of two heat sources, of which one is always under control, makes it possible to reach for such refining a large class of iron that could not possibly be treated successfully by the self-sustaining method. The best outside heat source, the only one that can be applied during refining to the refining zone and controlled with the greatest ease, is electricity.

For rapid refining very intimate and ever renewed contact between the iron to be refined and the refining ore must be created. Doing this in the manner obtained in the open hearth furnace, for instance, would not do. In this latter an amount of ore, limited by the amount of iron to be refined, is used in the furnace and not more. The lighter ore will naturally float freely and without restraint on top of the heavier liquid metal, into which it sinks only to its naturally limited depth of immersion or its natural depth of immersion. The contact thus obtained, instead of being renewed, decreases on the contrary with the melting of the ore until it becomes limited to the surface of contact between the liquid iron and the supernatent liquid slag formed. Refining is necessarily slow.

To obtain a largely increased amount of contact and to renew it, when in the course of refining it tends to decrease, it is proposed to use in the furnace at a normal period an amount of ore largely in excess of what would be required to refine to the desired extent the mass of liquid iron contained in the crucible. This so-called "excess of ore" in pieces used in the proposed method should be enough at all normal times to form above the surface of the metal a body of ore that by means of the furnace itself or by other means should be kept in a sufficiently compact body to act with its weight on the immersed ore below with sufficient power to push the latter down to any desired depth of immersion greater than its natural depth of immersion, which desired depth may be termed special immersion or special depth of immersion, and to keep it there for the necessary reactions and to renew it by pushing down new supplies of ore, when in the course of refining the ore confined in the bath becomes consumed and partly rises as melted slag to the surface of the metal. Thus the means employed to keep the ore on top of the bath in one solid column, making it possible for the latter to act with its weight on the ore in the bath and the weight of this ore column itself and any other feature of the furnace especially designed to prevent the immersed ore from leaving the bath except when liquefied and melted and any other means of any kind helping to push or keep immersed the ore in the bath beyond its natural depth of immersion, constitute what I may best call here "special immersion means." Other such means may be used.

Whatever the nature of the refining or oxidizing material used and whatever the name under which it is called, it is always to be considered as being constituted of pieces of solid ore, but it may be ore in pieces or any other suitable metallic oxid in pieces, forming a column of ore or an ore body in the refining apparatus.

The accompanying drawings will fully illustrate one furnace in which the method can be carried out with the application of electrical heating.

In these drawings: Figure I. is a vertical cross section of an electric furnace on line I—I of Fig. II. Fig. II. is a top plan view of Fig. I. Fig. III. is a vertical cross-section on line III—III of Fig. IV. Fig. IV. is a horizontal cross-section on line II—II of Fig. III. Fig. V. shows a modified portion of the furnace.

The furnace shown in Figs. I. and II. has a crucible or reaction zone 1, surrounded by firebrick wall 2, and a cast-iron water cooled roof 3, supporting a vertical ore shaft 4, preferably wider in its lower end, surmounted by a charging hopper arrangement 5. Three openings 6 in the roof lead to a circular bustle pipe 7 and a vertical pipe 8 closed on top by a valve 9, operated by lever 10; a connecting pipe 11 makes communication between pipe 8 and the top of the furnace. A number of electrodes 12, placed vertically around the upper shaft, traverse the roof and are in direct connection with one end of the electric current.

The bottom 13 is made of rammed carbon paste or graphite and has rods of iron 14 cast into the bottom plate 15 with a contact piece 16 in connection with the other end of the electric current. A slag hole 17 is placed in the upper part of the crucible, and an overflow opening 18 or a hole 27, shown in dotted lines, establishes communication between crucible 1 and reservoir 19. Overflow 18 may be placed at any convenient height above the bottom.

Reservoir 19 has a gas inlet 20 connected to bustle pipe 7 by communication 28, an air inlet 21, a smoke flue 22 and a tap hole 23. Pipe 8 is provided with a branch 24 and crucible 1 has a tap hole 25. An inlet for liquid iron is shown in 26. This inlet may be placed in any part of the height of the crucible or upper shaft.

Reservoir 19 may be left out if judged more convenient. In that case the reservoir side of the furnace would be terminated either as shown in Figs. III. and IV. where overflow 18 leads directly outside, or as shown in Fig. V. where the treated metal leaving through hole 27, flows into a forehearth 29, provided in its bottom with a nozzle 30, normally closed by a stopper 31. This stopper can be operated with any convenient device, left out purposely so as not to complicate the drawings.

No doors or openings are shown in any part of the apparatus; some would naturally be provided where judged necessary in reservoir, crucible and upper shaft.

For the preliminary heating of the apparatus, gas or oil can be introduced through gas port 20, or through smoke stack 22, or through any other opening especially provided for that purpose and the products of combustion can escape through hopper 5, or connection 11 or openings 6, after having heated the apparatus or the ore.

The operation is substantially as follows: After the apparatus has been filled with refining oxid or ore and everything is ready, the pig iron to be refined and purified is run through inlet 26. It will percolate and descend through the body of pieces of ore or metallic oxid in the furnace, accumulate on the bottom, its level will rise through the confined ore until it overflows at 18, while the slag formed will flow out through 17. Thus very intimate contact between ore and liquid iron is obtained and maintained. As the ore in the lower part is consumed in the purifying operation, new supplies of it are pushed down into the bath by the column of ore on top, additional ore can be introduced through the hopper and in its descent become gradually raised in temperature by the heat arising from the reaction zone below. The ore contained in the bath in the crucible will naturally scatter sidewise during the refining operation and once removed from the direct action of the weight of the ore body on top, it would rise laterally were it not prevented from doing so by the confining action of roof 3. This roof, therefore, constitutes a "special immersion means." The length of contact between ore and liquid metal will naturally vary with the amount of liquid iron that enters the vessel in the unit of time. The operation thus described is continuous. It may happen that once the supply of ore confined in the bath is consumed, the column of ore on top will not act with all its weight and to a sufficient extent to push a new supply of ore far enough down into the bath to create as much contact between ore and liquid iron as there should be for rapid and thorough reactions. This difficulty can easily be overcome in the following manner: The influx of liquid iron can be interrupted, and after the iron contained in the purifying zone has been exposed for a sufficient length of time to the purifying action of the immersed ore, it is tapped off through tap hole 25, or as the case may be, run off through 27 and 28. The level of the iron bath sinking, the ore column will naturally follow under its own weight or otherwise, until its base rests again on the bottom of the furnace, when the taphole can be closed and the liquid iron can again be poured in through 26. The same difficulty could be overcome by the arrangement of metal tapping shown in Fig. V, by means of which the metal is evacuated through nozzle 30, by raising stopper rod 31, after having stopped the influx of metal through inlet opening 26, and after enough refined metal has been evacuated through the nozzle to allow the foot of the ore column to again rest on the bottom, the nozzle 30 is again closed by stopper 31, and a new supply of metal to be refined is poured into the furnace through 26 and the same cycle of operations continued. With the use of any of these two means an intermittently continuous method is created, in which full intimate contact between liquid iron and refining material will easily be established. The ore once confined in the rising bath will naturally be kept there until consumed or melted under the influence of the special immersion means. In order to prevent any lowering of temperature during the operation the electric current is turned on, and passing between the electrodes 12 and bottom 13, traverses the layer of slag and the liquid metal, heating the possibly cooled or cooling bath to a temperature sufficiently high to easily run both iron and slag from the furnace. The electrodes, placed vertically, can be moved up and down to suit conditions. They are preferably kept at a short distance above the surface of the slag so as to prevent as much as possible any reaction between the carbon of the electrodes and the iron oxid of the slag, which under ordinary circumstances would have a cooling effect on the operation. The gases, to a large extent CO, developed during reactions, will escape through openings 6 into bustle pipe 7, or through connection 11, and can be burnt, together with additional gas or oil supplied through 24 or otherwise, above the surface of the metal bath gathering in reservoir 19. Thus, under certain conditions, part of the heat carried away by the gases resulting from the operation can be recuperated. The metal contained in reservoir 19 is evacuated through tap hole 23 and from crucible 1 through tap hole 25 if necessary. If, in Fig. I, overflow 18 is suppressed and the metal allowed to enter reservoir 19 through communication 27, shown in dotted lines, especially when this latter is made large, there will be practically only one single bath of metal extending over crucible and reservoir. In that case the metal bath will actually be heated up by both electricity and oil or gas, the latter partly derived if suitable from the reactions in the reducing zone and partly supplied from outside sources at will. Thus two external heat sources are employed in heating up the bath. Should it be desirable electricity could also be used to heat the reservoir.

The above described furnace was designed so as to embody features that will at all times during the operation create the special immersion means considered necessary to carry out the operation in the manner proposed. One of these features is the downward widening shaft, placed above the crucible. This shaft naturally keeps the ore in one solid column, that will press with sufficient weight on the ore in the bath to overcome the buoyancy and push down into the bath new supplies of ore to take the place of consumed refining material. Such a shaft put in a convenient place, but so as to create an immersion means, will therefore contribute very materially to the success of the operation.

Any other design of furnace may be adopted, as well as any other immersion means, that will produce special immersion of the ore.

I claim as my invention:

1. A process of purifying and refining pig iron by means of iron ore, which process consists in introducing into an electrical refining furnace provided with special immersion means, an excess of ore in pieces, pouring liquid pig iron into the furnace in such a manner that the liquid pig iron will percolate through the mass of ore in pieces, causing a bath of liquid metal to accumulate on the bottom of the furnace, letting the level of the bath rise to a desired height through the mass of ore pieces, creating and maintaining special immersion of ore pieces in the bath for the period desired with the aid of the special immersion means, raising the temperature of the metal in the crucible to a desired height during the refining operation by means of the electrical heating, then separating the liquid purified metal from the oxidizing material, substantially as and for the purpose set forth.

2. A process of purifying and refining pig iron by means of iron ore, which process consists in placing into an electrical refining furnace provided with special immersion means, an excess of ore in pieces, introducing liquid pig iron into the crucible of the furnace, causing a bath of liquid metal to accumulate on the bottom of the furnace, making the level of the bath to rise to a desired height through the mass of ore pieces confined in the crucible, creating and maintaining for a desired time special immersion of ore in the bath of metal with the aid of said special immersion means acting on the refining material above the bath, keeping the temperature in the crucible at a desired height by means of the electrical current during the refining operation, then separating the liquid purified metal from the oxidizing material, substantially as and for the purpose set forth.

3. A process of purifying and refining pig iron in an electrical furnace provided with a crucible and an ore shaft above the crucible, which process consists in charging through the ore shaft ore in pieces into the crucible and the ore shaft, introducing liquid pig iron into the crucible, allowing a bath of said pig iron to accumulate on the bottom of the crucible, allowing the level of said bath to rise to a desired height through the lower part of the mass of ore pieces in the crucible, keeping the ore immersed in said metallic bath for a desired period under the action of the weight of the ore in the shaft and the confining action of the roof over the crucible, heating the metal in the crucible to a desired temperature during the refining operation by means of electricity, then separating the liquid purified metal from the oxidizing material, substantially as and for the purpose set forth.

4. A process of purifying pig iron by means of iron ore in pieces in an electrical furnace provided with an ore shaft, a crucible and a forehearth, which process consists in refining liquid pig iron in the crucible of the furnace by means of an excess of iron ore in pieces, kept immersed in the liquid iron to a desired depth under the influence of special immersion means, allowing the liquid purified iron to run from said crucible into said forehearth, keeping the metal in the crucible heated up by electricity during the refining operation, and keeping the metal in the forehearth heated up by the heat from a flame playing over the surface of the metal contained in said forehearth, substantially as and for the purpose set forth.

5. A process of purifying and refining pig iron by means of iron ore in an electrical furnace provided with an ore shaft, a crucible and a forehearth, which process consists in refining liquid pig iron in said crucible of said furnace by means of iron ore in pieces kept immersed in said liquid iron to a desired depth under the influence of special immersion means, allowing the liquid purified iron to run from said crucible into said forehearth, keeping the metal in said crucible heated up by electricity during the refining operation, and keeping the metal in said forehearth heated up by heat from an outside source.

6. A continuous process of purifying and refining pig iron in an electrical furnace provided with special immersion means, which process consists in charging an excess of ore in pieces into said furnace, bringing liquid pig iron in contact with the lower part of the ore body, causing a bath of said pig iron to accumulate on the bottom of said furnace, allowing the level of the bath to rise through the mass of ore in pieces, maintaining immersion of the lower part of the ore body in the metallic bath under the action of said special immersion means, drawing off liquid purified metal from the lower part of the ore body, drawing off the slag formed by the reactions, making the ore body descend in the furnace, adding new supplies of ore at the top of the ore body, introducing additional liquid pig iron to the lower part of the ore body, and heating the metal in the reaction zone to the desired temperature by means of the electrical current during the purifying period and before drawing off said metal.

7. A process of purifying and refining pig iron in an electrical furnace provided with a crucible and an ore shaft, which process consists in charging the ore in pieces into the crucible and the ore shaft, introducing liquid pig iron into the crucible, allowing a bath of said pig iron to accumulate on the bottom of said crucible, allowing the level of said bath to rise to a desired height through the lower part of the mass of ore pieces in the crucible, keeping the ore immersed in the metallic bath for a desired period under the action of the weight of the ore in the shaft and the confining action of the roof over the crucible, stopping the introduction of liquid metal into the crucible, heating the metal in the crucible to a desired temperature by means of electricity, withdrawing refined iron from said crucible, allowing the ore body to descend in the crucible, adding new ore on top of the ore body in the furnace, introducing more pig iron into said crucible, allowing the level of said iron to rise again through the lower part of the ore body, and keeping the temperature of the iron in the crucible at a desired height, substantially as and for the purpose set forth.

8. A process of purifying and refining pig iron in an electrical furnace, and obtaining a partially refined iron at a desired temperature, which process consists in immersing and keeping immersed lighter refining ore in pieces beyond its natural depth of immersion in the heavier liquid iron to be refined, and of raising the partially refined iron to a desired temperature by means of electrical heating before withdrawing said iron from said electrical furnace.

In testimony whereof, I have signed my name to this specification in the presence of two subscribing witnesses, this fifteenth day of September, 1909.

JOHN B. NAU.

Witnesses:
SIGMUND S. GUTMAN,
DAVID C. GOODMAN.